United States Patent [19]

Zbinden

[11] Patent Number: 5,382,085
[45] Date of Patent: Jan. 17, 1995

[54] ELECTROHYDRAULIC OR ELECTROPNEUMATIC BRAKING CONTROL DEVICE FOR AXLES OF TRAILERS WITH MECHANICAL BRAKES, AND SAFETY VALVE

[76] Inventor: Otto Zbinden, La Chauderette, 1728 Rossens, Switzerland

[21] Appl. No.: 920,278

[22] PCT Filed: Dec. 17, 1991

[86] PCT No.: PCT/CH91/00272

§ 371 Date: Aug. 13, 1992

§ 102(e) Date: Aug. 13, 1992

[87] PCT Pub. No.: WO92/11151

PCT Pub. Date: Jul. 9, 1992

[30] Foreign Application Priority Data

Dec. 17, 1990 [CH] Switzerland ............ 3995/90

[51] Int. Cl.⁶ .................. B60T 13/14; B60T 13/68
[52] U.S. Cl. ............................. 303/7; 303/10; 303/20; 303/22.1; 303/DIG. 3
[58] Field of Search ............ 303/7, 20, 10, 11, 22.1, 303/22.2, 113.4, DIG. 3, DIG. 4; 188/1.11, 2 D, 170; 251/129.03

[56] References Cited

U.S. PATENT DOCUMENTS

| | | | |
|---|---|---|---|
| 3,951,464 | 4/1976 | Donahue et al. | 303/7 |
| 4,370,714 | 1/1983 | Rettich et al. | 364/426.02 |
| 4,640,555 | 2/1987 | Bertling et al. | 303/11 X |
| 4,697,852 | 10/1987 | Scholz | 303/20 X |
| 4,708,225 | 11/1987 | Feldman et al. | 188/1.11 |
| 4,749,236 | 6/1988 | Graham | 188/170 X |
| 4,749,238 | 6/1988 | Singleton et al. | 303/20 X |
| 4,877,294 | 10/1989 | Kuhn et al. | 303/7 X |
| 5,002,343 | 3/1991 | Brearley et al. | 303/7 |
| 5,033,798 | 7/1991 | Breen | 303/20 |

FOREIGN PATENT DOCUMENTS

| | | |
|---|---|---|
| 0363827 | 10/1989 | European Pat. Off. |
| 2208936 | 2/1972 | Germany |
| 3133102 | 6/1982 | Germany |
| 3512110 | 10/1986 | Germany |

*Primary Examiner*—Robert J. Oberleitner
*Assistant Examiner*—Alfred Muratori

[57] ABSTRACT

The electrohydraulic or electropneumatic braking-control device for axles of trailers having mechanical brakes includes a hydraulic or pneumatic circuit mounted on the trailer, made up principally of a pressure accumulator, the internal pressure of which is automatically adjusted above a minimum value, as well as of a control gate, the opening of which is proportional to a control current function of the pressure exerted on the brake pedal of the tractor vehicle and of an adjustment carried out as a function of the load of the trailer. In case of attachment parting or of unhitching of the trailer, the disconnection of the connection plug actuates a safety valve that automatically controls the energetic braking of the trailer. The safety valve includes a manual control. It is possible to unbrake, then to rebrake the trailer in order to maneuver it. The trailer braking device may be mounted from the outset or subsequently, requiring only few transformations of the tractor vehicle.

16 Claims, 3 Drawing Sheets

ELECTROHYDRAULIC OR ELECTROPNEUMATIC BRAKING CONTROL DEVICE FOR AXLES OF TRAILERS WITH MECHANICAL BRAKES, AND SAFETY VALVE

BACKGROUND OF THE INVENTION

The present invention relates to a braking device with fluid control, generally electrohydraulic or electropneumatic, intended for the braking of trailers provided with mechanical brakes, as well as a safety valve usable particularly with this device.

Various control systems for braking of a trailer attached to a tractor vehicle have been known for a long time, particularly the system called inertial, the action of which is controlled by the deceleration of the tractor vehicle, but the use of which is prohibited by certain laws for trailers of which the load exceeds a fixed value. Another known system is that of which the control is pneumatic, necessitating the installation of a compressor on the tractor vehicle and the passage of pneumatic conduits between the tractor vehicle and the trailer; though this system is efficient, it is costly, impractical, and relatively polluting to the extent that the air loaded with residues of oil and of antifreeze is returned to the ambient air. As a variation of the preceding system, the depression system may be encountered, the depression necessary for the control of the brakes of the trailer being drawn from the engine: this system has a relatively long response time and also comprises impractical pneumatic conduits between the tractor vehicle and the trailer. In agriculture, where the tractors are generally equipped with a central hydraulic unit, the trailer braking control can take place hydraulically, a hydraulic conduit connecting the tractor to the trailer. Another known braking system is the electric system, an electric signal being supplied to an electromagnet disposed on the brake flange, causing it to lie flat against a disk driven by the wheel of the trailer, this driving movement actuates an eccentric controlling the distance between the shoes disposed within the brake drum; this system, though it has the advantage of not necessitating any pneumatic or hydraulic conduit between the tractor vehicle and the trailer, but solely an electric conduit clearly more practical than the preceding ones, presents the drawbacks that the regulation of the braking forces between the two or the four wheels of the trailer is rather difficult and that braking effectiveness depends very much upon the temperature of the disk.

The published application DE-A-3,133,102 describes a braking device by which the control between the tractor vehicle and the trailer takes place by electric means. However, this device necessitates rather complex electronic means in order to create a non-continuous electric signal, a function of the desired braking action, which is compared with another electric signal representing the instantaneous hydraulic pressure prevailing within the hydraulic braking circuit. The signal resulting from this comparison generates, by other electronic means, two signals acting differentially on two valves of the hydraulic circuit. Besides the fact that considerable electronic means are necessary in this device, the differential action on two different valves may create undesirable braking effects in case of imbalance between the two control circuits, hence between the two valves.

Another device is described in the patent US-A-3,951,464, where the control of the hydraulic circuit is also obtained by electric means. In this case, the electric braking-control signal acts directly upon a motor controlling a pump delivering the oil pressure necessary for braking; this configuration renders a braking effect proportional to the required action impossible. On the other hand, in order to be able to have a braking action when the trailer is unhooked, hence when the connecting cable is disconnected, an additional battery is necessary on the trailer. This additional element is costly and requires maintenance.

SUMMARY OF THE INVENTION

The object of the invention is therefore to propose a braking device which does not comprise the mentioned drawbacks of the prior art systems and the advantages of which are the following: elimination of any impractical hydraulic or pneumatic conduit between the tractor vehicle and the trailer, immediate, gradual braking action proportional to the force exerted on the pedal, possibility of regulating the braking action according to the load of the trailer, automatic and immediate braking of the trailer upon disconnection of the electric control cable between the tractor vehicle and the trailer, possibility of unbraking the trailer manually in order to move it manually, elimination of any polluting rejection in the atmosphere, braking effectiveness independent of the temperature or of repeated brakings. In addition, the device according to the invention needs only minor and inexpensive modification or adaptations on the tractor vehicle since the device installed on the trailer can be mounted from the beginning or adapted to existing trailers of any carrying capacity, without necessitating the installation of a battery on the trailer. Moreover, a safety valve controlling automatic braking in case of disconnection of the electrical connection has been specially developed to be integrated into this device, the mechanical control of this valve not being actuatable when the electrical connection between the tractor vehicle and the trailer is established.

In order to achieve the above objects, the braking device according to the invention includes an electro-fluid device having an electric motor for driving a device that puts a pressure accumulator under pressure. The pressure accumulator feeds a fluid control circuit that includes a pressure-limited valve, a control valve and a safety valve. The valves control a braking jack actuating the brakes of the trailer, wherein the electric braking-control signal acts on the control valve such that the electro-fluid device is controlled only by the electric braking control signal.

BRIEF DESCRIPTION OF THE DRAWINGS

The description below is to be read in relation to the enclosed drawing comprising the figures in which.

DETAILED DESCRIPTION OF PREFERRED EMBODIMENTS

Figure 1:
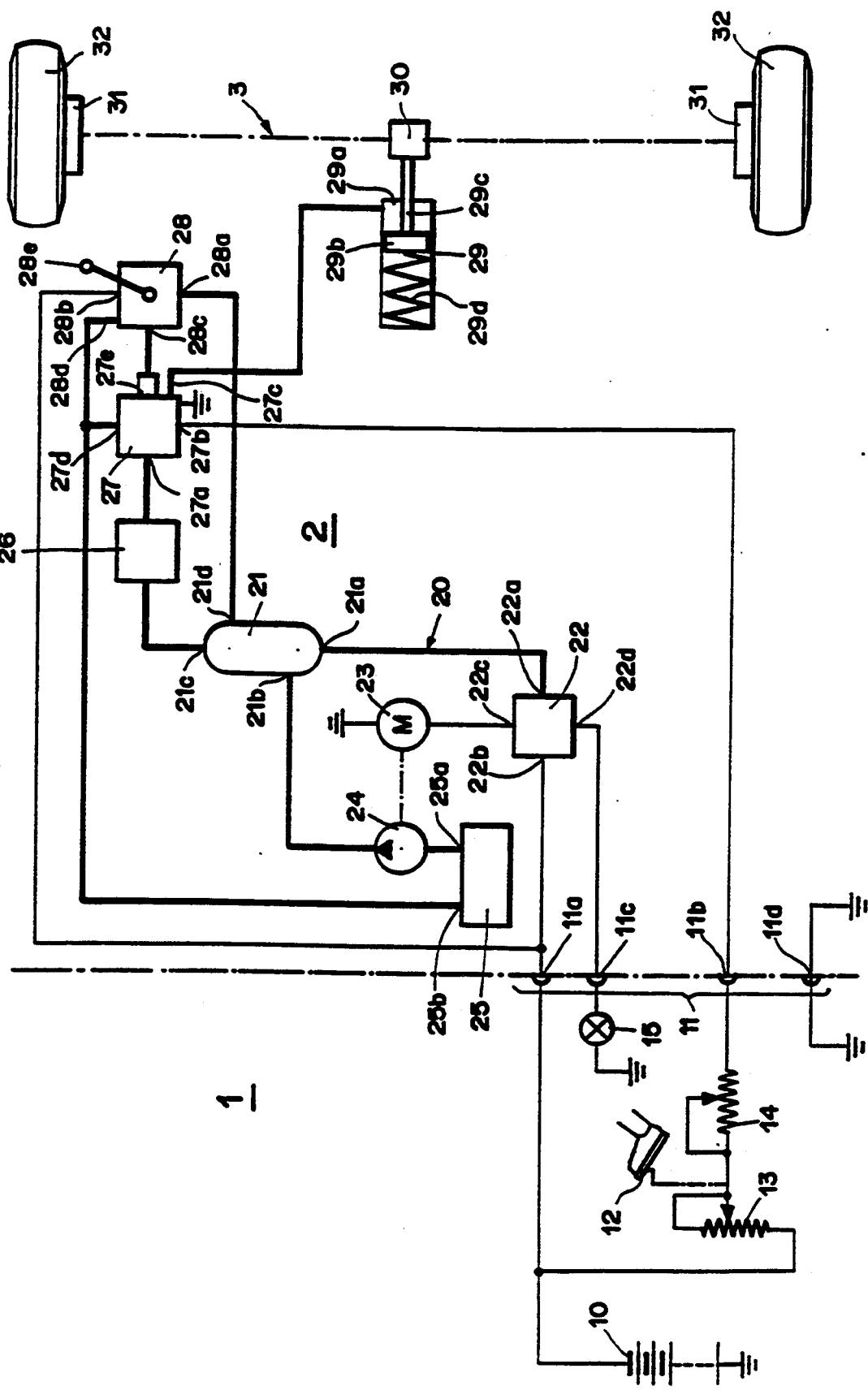
FIG. 1 represents a basic diagram of a preferential embodiment of a braking device according to the invention.

The left-hand part of FIG. 1 (to the left of the vertical dot-dash line), marked as 1, represents diagrammatically the part of the braking system mounted on the tractor vehicle, whereas the right-hand part of the figure (to the right of the vertical dot-dash line), marked as 2, represents the part of the braking system mounted on the trailer and including a preferential embodiment of the device according to the invention.

Let us first consider the case where the trailer is attached to the tractor vehicle and the electrical connections depicted in the figure are established between the tractor vehicle and the trailer by the connection plug 11 including the contacts 11a, 11b, 11c, and 11d. It is to be noted that this connection 11 is the only connection peculiar to the braking system between the tractor vehicle and the trailer. The hydraulic circuit 20 includes first of all a pressure accumulator 21 connected by its outlet 21a directly to the hydraulic intake 22a of a pressostat 22. When the hydraulic pressure in the pressure accumulator 21 drops below a first minimum value (for example, about 40 bar), the pressostat 22 closes a contact between its terminals 22b and 22c, which brings the voltage supplied by the voltage/current source 10 to the terminals of the electric motor 23 by way of the terminal 11a of the connection plug 11. The voltage/current source 10 may be of any type compatible with the various elements and components of the electric circuit of the vehicle and of the braking device, for example, a 12V or 24V battery, or else it may be a matter of any type of device capable of supplying a voltage and a suitable current. The electric motor 23 directly actuates a hydraulic pump 24 which is coupled to it, said pump 24 pumping the oil contained in an oil reservoir 25 via the outlet 25a toward the intake 21b of the pressure accumulator 21, in order to raise the hydraulic pressure in said pressure accumulator. When the pressure within the pressure accumulator 21 has reached a certain value (for example, about 120 bar), the pressostat 22 opens its contact 22b-22c, thus interrupting the feed of the motor 23 and consequently the operation of the pump 24. The outlet 21c of the pressure accumulator is followed by a pressure-limiting valve 26 responsible for limiting the pressure of the hydraulic circuit before a control valve 27, so that the intake 27a of said control valve is always at the same hydraulic pressure. When the driver of the tractor vehicle wishes to brake, he presses on the brake pedal 12 of the vehicle, a variable resistor 13 being connected to the main cylinder (not shown) of the braking circuit of the tractor vehicle. As the braking circuit peculiar to the tractor vehicle does not form part of the present invention, it is not depicted in the figure, aside from the brake pedal 12. By actuating the variable resistor 13, so as to reduce its value, a current can be established starting from the battery 10, toward the terminal 27b of the control valve 27, passing through the terminal 11b of the connection plug 11. This control valve is a proportional-effect pressure valve, i.e., its opening is proportional to the current it receives. In other words, the pressure of the oil at the outlet 27c, or the quantity of oil leaving through the outlet 27c of the control valve 27, respectively, is proportional to the current which is sent to it at the terminal 27b. The oil leaving through the outlet 27c enters the chamber 29a of a hydraulic jack 29. The hydraulic pressure then acts upon the piston 29b which, by way of the piston rod 29c, then actuates the mechanical braking mechanism 3, diagrammed by a transmission 30 acting upon the shoes of two brake drums 31 disposed in the wheels 32. At the time of its displacement, the piston 29b compresses the spring 29d. Thus, a slight pressure on the pedal 12 brings about a slight lessening of the resistance 13, the battery 10 then supplies only a slight current to the control valve 27, which opens by only a slight value, causing a slight increase in pressure, or allowing only a slight volume of oil to pass, respectively, thus bringing about a slight displacement of the piston 29b and consequently a slight braking action on the wheels 32. On the other hand, when the pressure on the pedal 12 is strong, the variable resistor 13 is brought to its minimum value, which permits the battery 10 to supply a maximum value of current to the control valve 27, which, opening to the maximum, increases the pressure by a considerable quantity, or permits the flow of a considerable quantity of oil from the pressure accumulator 21 toward the hydraulic jack 29, respectively, then producing a strong braking effect. Thus, the braking action on the wheels 32 of the trailer is gradual and proportional to the pressure applied by the driver to the brake pedal 12 of the tractor vehicle. When the pressure on the pedal 12 ceases, the resistor 13 no longer allows current to pass, the control valve 27 closes its passage between the orifices 27a and 27c and connects 27c to 27d, in such a way that the excess oil coming from the chamber 29a, pressed by the spring 29d against the piston 29b, can flow in the direction of the intake 25b of the oil reservoir 25.

As has been said previously, the braking action on the wheels 32 is proportional to the value of the current feeding the control valve 27; seeing, on the other hand, that the necessary braking action depends essentially on the load that the trailer must transport, the variable resistor 14 allows the braking action to be metered as a function of the load of the trailer. For example, when the trailer is empty, the variable resistor 14 will be set to a high resistance value, thus allowing a relatively low current to pass whatever the pressure applied to the pedal 12 may be; on the other hand, when the trailer is loaded to the maximum, the value of the resistor 14 is set to the minimum, allowing a maximum current to pass, which brings about a maximum braking action when the driver acts energetically upon the brake pedal 12. The variable resistor 14 may be placed on the tractor vehicle as depicted in the figure, or else on the trailer. The dial surrounding the regulating button of the resistor 14 may be graduated in units of load of the trailer.

In case of leakage in the oil circuit 20 or malfunctioning of the electric motor 23 or of the hydraulic pump 24 entailing a drop in hydraulic pressure in the pressure accumulator 21, the pressostat has a second contact connecting the terminals 22b and 22d when the pressure of the pressure accumulator 21 dwindles to a second minimum value (for example, about 30 bar), lower than the first minimum value seen above. Thus, an alarm circuit, which may be a pilot lamp 15 mounted on the instrument panel, is fed by the battery 10, via the contact 22b-22d of the pressostat 22 and the terminals 11a and 11c of the connection plug 11, and signals that the hydraulic pressure in the pressure accumulator has dropped to a minimum value and that the braking device of the trailer is defective. The minimum value of the pressure at which this alarm is set off must nonetheless be sufficient to ensure a few more braking actions of the trailer with the aid of the remaining pressure. The alarm circuit has been represented by a pilot lamp 15, but in place of or in addition to said lamp, it may include any other alarm means, for example, an acoustic alarm.

The terminal 11d of the connection plug 11 connecting the two grounds of the vehicle and of the trailer is depicted for proper understanding of the electrical diagram of the device.

Thus, when the trailer is attached to the tractor vehicle and the connection plug 11 is connected, there is automatic pressurizing of the hydraulic circuit 20, an alarm in case of malfunctioning, and a control for braking the trailer proportional to the action applied to the brake pedal 12 of the tractor vehicle, as well as a possible adjustment of the braking action as a function of the load of the trailer.

In case of actuation of the hand-brake of the tractor vehicle, a control (not shown) similar to that previously described for the brake pedal acts in a similar manner in order to brake the trailer.

The safety valve according to the invention 28 permits braking of the trailer to be checked in case of uncoupling of the latter from the tractor vehicle, whether this uncoupling be voluntary or not, entailing disconnection of the connection plug 11 whereby the trailer is then no longer fed with voltage or electric current. It is described opposite this figure as well as the following one solely from the point of view of operation and integration into the braking device; a more complete description of it will be made opposite FIGS. 3A, 3B, and 3C.

When the terminal 27b is no longer supplied electrically, the control valve 27 closes in case it was previously open or remains closed, which prevents it from controlling the braking. The safety valve 28, which is no longer supplied electrically via its terminal 28b either, switches in order to open a passage between the intake 28a and the outlet 28c in order to feed, by the hydraulic pressure of the pressure accumulator 21, via its outlet 21d, an auxiliary piston 27e disposed on the control valve 27 and controlling a complete opening of the connection 27a-27c, thus establishing the maximum hydraulic braking pressure in the hydraulic jack 29, which corresponds to emergency braking. The opening of the control valve 27 may therefore be controlled in two different ways, first of all proportionally by the action of a current or of an electric voltage acting through the terminal 27b of a coil, as well as by the action of the auxiliary piston 27e acting through all or nothing on the opening of this control valve 27. These two controls are independent and uncoupled from one another, the control by the auxiliary piston 27 being effective only if the control by the coil is inhibited for lack of power supply.

Seeing that the safety valve 28 comprises a manual opening/closing control 28e, it is possible to cause said valve to switch manually in order to unbrake the trailer, letting the oil escape via the outlet 28d of the valve 28, or 27d of the valve 27, respectively, toward the reservoir 25, in order to maneuver the trailer by hand; by actuating the manual control 28e once more, it is possible to actuate braking of the trailer once more, and this a number of times, as long as the pressure contained in the pressure accumulator 21 is sufficient.

Thus, disconnection of the connection plug 11 entails energetic braking of the trailer, this disconnection being able to occur owing to a parting of the attachment or else when it is desired to park the trailer independently of the tractor vehicle, for example. After disconnection of the connection plug 11, it is always possible to brake or unbrake the trailer by acting on the manual control 28e.

Figure 2:
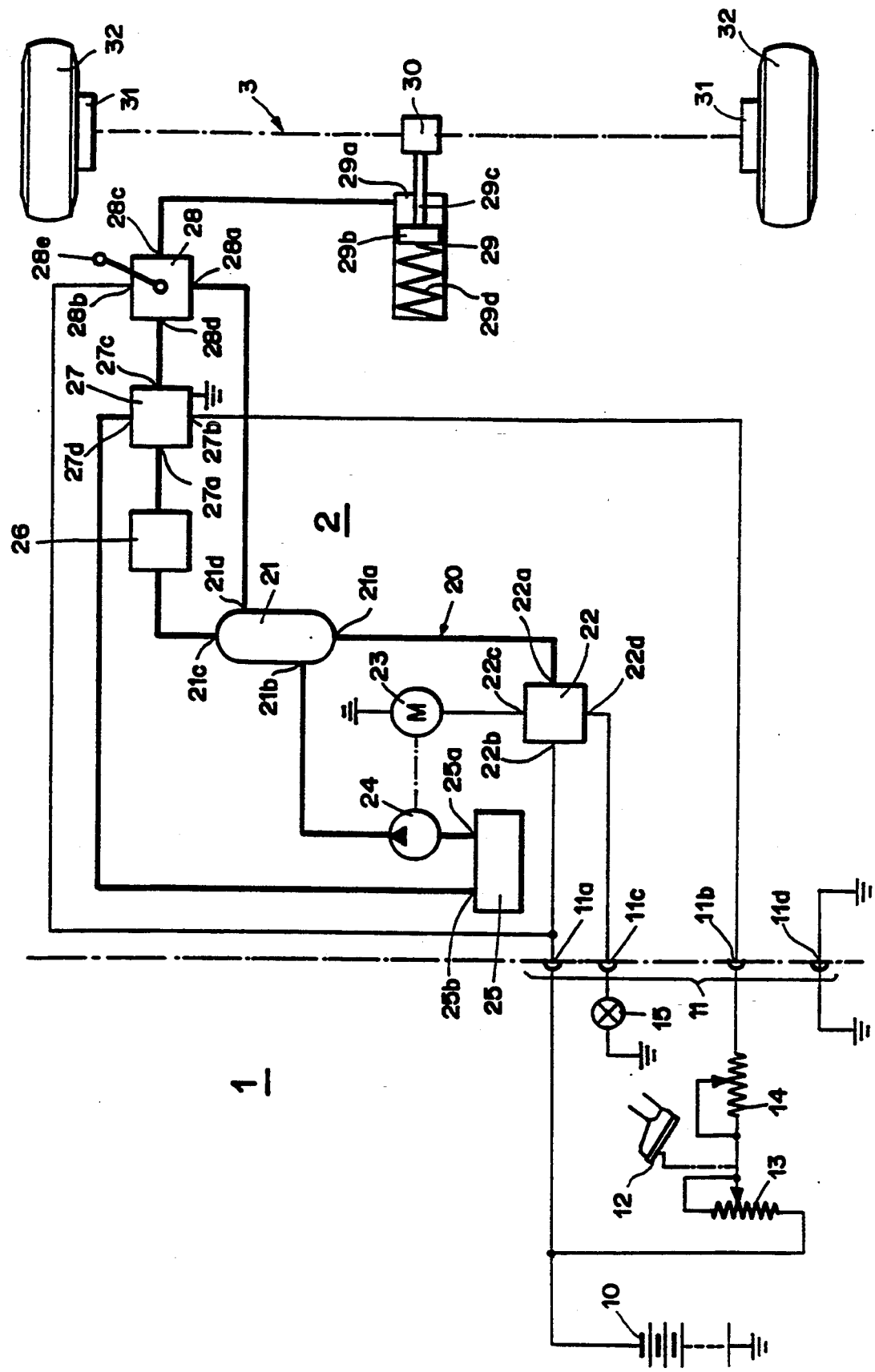
FIG. 2 represents a basic diagram of another embodiment of a braking device according to the invention.

Another embodiment of a braking device according to the invention is represented in FIG. 2, the difference as compared with the preceding embodiment residing in the relative arrangement of the safety valve 28 with respect to the control valve 27. In this case, the safety valve 28 is disposed in the main hydraulic circuit, between the control valve 27 and the hydraulic jack 29. When the coil, or the terminal 28b, respectively, is fed, the passage is established between the intake 28d and the outlet 28c of the safety valve 28, permitting the control valve 27 to act proportionally on the hydraulic jack 29. In case of interruption of the electrical power supply and closing of the control valve 27, the connection 28d-28c also closes, a new connection between the intake 28a and the outlet 28c being established in order to feed the hydraulic jack 29 directly by the pressure from the pressure accumulator 21, thus establishing emergency braking. As previously it is possible to unbrake the trailer manually by acting on the hand lever 28e, which cuts off the connection 28a-28c and re-establishes the connection 28c-28d, permitting the oil contained in the jack 29 to escape and return to the reservoir 25 through the passage 27c-27d.

Figure 3A:
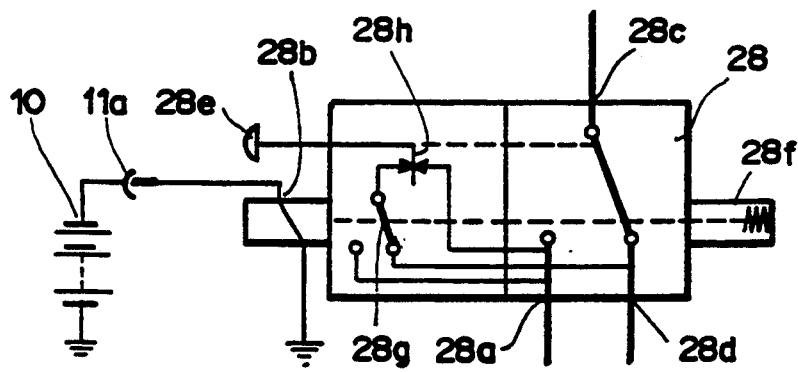
FIGS. 3A, 3B, 3C, and 3D represent diagrammatically four operating states of the safety valve according to the invention.

FIGS. 3A, 3B, 3C, and 3D show in more detail the safety valve 28 according to four states of operation. In FIG. 3A, the trailer is attached to the tractor vehicle, or the terminal 28b feeding the coil of the valve is live, respectively, through the battery 10 and via the plug 11a. Hence the passage between the intake 28a and the outlet 28c is open, i.e., interrupted, whereas the one between the intake 28c and the outlet 28d is closed, i.e., enabled. The energizing of the coil compresses the spring 28f. In addition, this state of operation of the coil causes the auxiliary valve 28g to switch, as indicated in FIG. 3A, in such a way that the pressure acting on one side of a mechanical device 28h connected to the control rod 28e is less than that acting on the other side of the same device. In this case, the first side of the device 28h is subjected to the pressure which prevails in the passage 28c-28d and which is always less than the pressure applied to the second side of the device 28h and which is equal to the outlet pressure of the pressure accumulator 21. Even in the case of the second embodiment of the device described previously, the maximum pressure which can occur in the passage 28c-28d will always be less than the outlet pressure of the accumulator 21 owing to the presence of the pressure limiter 26 in the circuit. In view of the imbalance of pressures between the two sides of the device 28h, it is not possible to manipulate the control 28e, thus rendering an inopportune manual manipulation impossible. Thus, when the terminal 28b is supplied electrically, the hydraulic passage is established between 28c and 28d, which renders inactive the auxiliary piston 27e of FIG. 1 corresponding to the first embodiment or ensures the passage of oil from the main braking circuit according to the second embodiment of FIG. 2. Moreover, the passage between 28a and 28c is interrupted, causing the safety valve 28 to be inactive for controlling braking in this state of operation for both embodiments. Seeing that this mode of operation corresponds to the one where braking is controlled by the control valve 27, it must not be possible to control braking by the mechanical device 28e, which is ensured as described above.

Figure 3B:
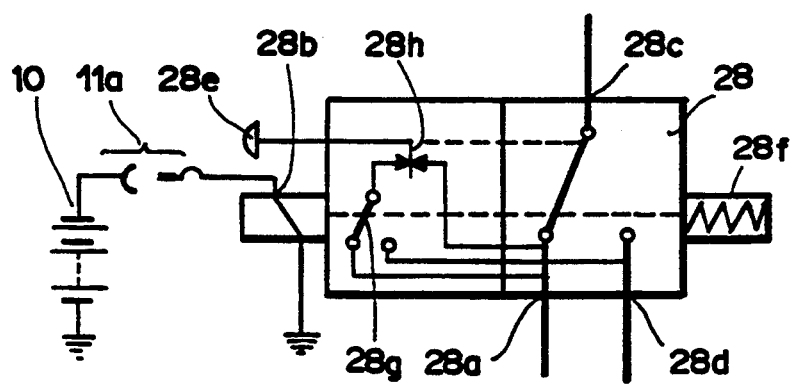

In FIG. 3B, the plug 11a is open, whereby the terminal 28b is no longer fed, and emergency braking is controlled, through the action of the spring 28f, by the closing of the connection 28a-28c, which in the first embodiment permits feeding of the auxiliary piston 27e by the pressure from the pressure accumulator 21, and in the second embodiment permits direct feeding of the hydraulic jack 29 by the pressure accumulator 21. In addition, the auxiliary valve 28g has flipped, bringing about identical pressure on both sides of the device 28h, which permits manual manipulation of the lever 28e, as is seen in FIGS. 3C and 3D.

Figure 3C:
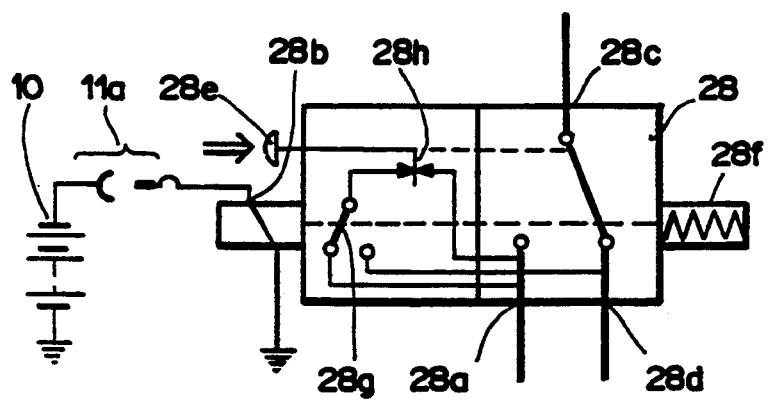
Figure 3D:
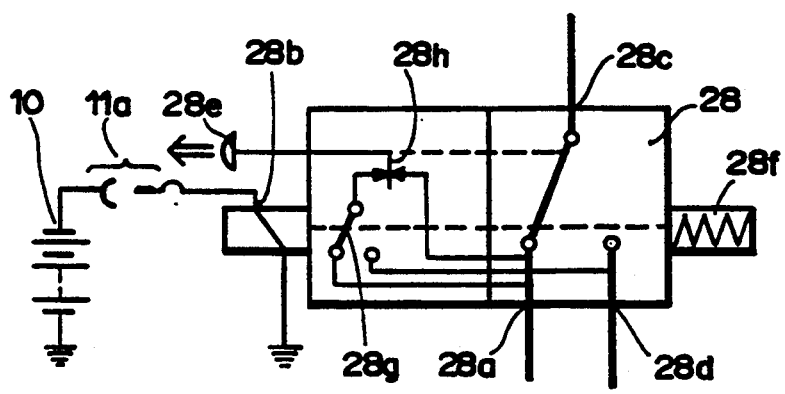

Manipulation of the lever 28e, as depicted by the arrow in FIG. 3C, permits manipulating solely the main valve, interrupting the connection 28a-28c, which unbrakes the trailer, and establishing the connection 28d-28c, which permits the escape of oil toward the reservoir 25. By again manipulating the lever 28e, as depicted by the arrow in FIG. 3D, the trailer is again braked. Thus, it is seen that when the coil is not supplied electrically, it is possible to manipulate the lever 28e, in one direction or the other, in order to unbrake or brake the trailer, respectively.

Thus, the safety valve according to the invention, comprising an electrical control and a mechanical control, and the mechanical control of which can be inhibited by a pressure which is applied to it or put in condition to be activated by a counterpressure, may advantageously be introduced into the hydraulic circuit of a braking device according to one or the other of the embodiments foreseen. A safety valve of which the control is such as described may also be used for other applications.

Fine adjustment of the braking on each wheel takes place mechanically on each brake drum according to the type of brake drum mounted on each wheel.

This braking device according to the invention is preferably twinned with a mechanically controlled independent braking device known in the art and peculiar to the trailer (not shown), directly actuating the mechanical transmission 30 in order that when the trailer is parked for a certain length of time, the braking action is not caused by the hydraulic pressure in the chamber 29a of the jack 29.

The hydraulic diagram of the braking circuit has been depicted for the two embodiments in a simplified manner, it may also include one or more complementary elements not shown, as, for example, one or more overpressure limiters disposed at suitable locations in order to render the emergency braking less violent.

Each of the two embodiments has been described as relating to a hydraulic control, it is well understood that it has to do more generally with a fluid control which may also be, for example, a pneumatic control carrying out the same functions, the hydraulic pump being replaced by a compressor, the hydraulic valves becoming pneumatic valves. According to still another embodiment of the invention, the hydraulic or pneumatic braking control may be negative instead of positive as described above, i.e., the braking action is no longer controlled by pressure in the chamber of the jack while the unbraking is controlled by the opposing spring, but braking can be controlled by the spring, the pressure in the chamber of the jack opposing said braking; in this case, certain modifications must be made to the hydraulic or pneumatic circuit, in particular the action of the control valve as well as of the safety valve are reversed as compared with what has been described previously.

According to still another embodiment, in case the tractor vehicle is already equipped with a central hydraulic or pneumatic unit, it is possible to eliminate the motor and the pump provided on the trailer, the pressure accumulator being directly fed by said central unit of the tractor vehicle through an appropriate conduit.

Diverse variants of the braking device according to the various embodiments of the invention described above may be envisaged, in particular the device has been described and depicted applied to a trailer having a single axle, but it is well understood that said device applies just as well to a trailer comprising several axles, then the hydraulic or pneumatic jack can be single, the transmission of the braking control between the axles taking place mechanically, or else each axle may comprise its own hydraulic or pneumatic jack, said jacks being mounted in parallel in the hydraulic or pneumatic circuit, the dimensions of each of the jacks being chosen according to the braking force to be applied to the axle in question. Likewise, the control of each brake drum may comprise its own jack directly controlling the distance between the shoes, all said jacks being mounted in parallel. The electrical control of the braking device, such control not forming part of the invention, has been described and depicted in a simplified manner; other systems, including in particular control cases or suitable relays, may be provided on condition that the effects caused are similar to those described. Likewise, in certain cases, it may be advantageous for the control connection between the tractor vehicle and the trailer not to be ensured by a DC connection but by an electromagnetic radio link established between two antennas or a transmitter and a receiver.

The braking device according to the invention, with electrical control and with hydraulic or pneumatic and mechanical effect, therefore has a very reliable operation, the effect of the pressure on the brake pedal on the braking action of the trailer is absolutely proportional and adjustable as a function of the load, the braking security in case of parting of the attachment is guaranteed. This braking device according to the invention may be mounted from the outset on a trailer or else easily installed later on, the cost of installation being relatively moderate as compared with a more conventional device. The low cost of installation derives essentially from the slight necessary transformations or adaptations of the tractor vehicle; in particular, tractor vehicles already equipped for an electric braking device of the trailer will require only very little adaptation.

The braking device according to the invention may be installed on all types of trailers, drawn by vehicles of any type, without limitation of the carrying capacity; it adapts both to drum brakes and to disk brakes, as well as to those provided with an anti-blocking system of the ABS or other type.

The braking device according to the invention may advantageously be equipped with a safety valve according to the invention in order to prevent an inopportune manual manipulation of the braking device.

I claim:

1. A device for braking a trailer attached to a tractor vehicle, said tractor vehicle comprising means supplying an electric braking-control signal, said trailer comprising electro-fluid means for actuating mechanical brakes, wherein said electro-fluid means comprises:
an electric motor;

means driven by said electric motor for putting a pressure accumulator under pressure, said pressure accumulator feeding a fluid control circuit including:
- a pressure limiting valve
- a control valve, and
- a safety valve;

said valves controlling a braking jack actuating brakes of said trailer, said electric braking-control signal acting upon the control valve such that said electro-fluid means is controlled only by said electric braking-control signal.

2. A braking device according to claim 1, wherein said electric control signal is proportional to the desired braking action, and the opening of the control valve is proportional to said electric signal.

3. A braking device according to claim 2, wherein said means supplying an electric braking-control signal comprise means for regulating the signal, said regulating means being adjustable according to a load of the trailer.

4. A braking device according to claim 2, wherein disconnection of an electrical connection between the tractor vehicle and the trailer causes said safety valve to switch in order to put said pressure reservoir in direct communication with said braking jack.

5. A breaking device according to claim 4 wherein said safety valve is controllable manually in order to unbrake the trailer.

6. A braking device according to claim 5 wherein said safety valve comprises an electrical control and a mechanical control, the actuation of the mechanical control being inhibited by a fluid pressure acting upon it along a first direction when the electrical control is in a first state, the actuation of the mechanical control being possible by a fluid counterpressure acting upon it along a second direction opposite to the first one when the electrical control is in another state.

7. A braking device according to claim 2, wherein said electric control signal is an electromagnetic signal transmitted from the tractor vehicle to the trailer a radio channel.

8. A braking device according to claim 2, wherein the brakes of the trailer are also controlled by the actuation of the hand brake of a tractor vehicle.

9. A braking device according to claim 1, wherein a pressostat disposed on said pressure accumulator controls starting-up of said motor driving said means for putting under pressure when said pressostat measures a first minimum pressure.

10. A braking device according to claim 9, wherein said pressostat actuates an alarm situated on the tractor vehicle when said pressostat measures a second pressure lower than said first minimum pressure.

11. A braking device according to claim 1, wherein said jack actuating the brakes has a positive pressure control.

12. A braking device according to claim 11, wherein said brakes are one of drum brakes and disk brakes.

13. A braking device according to claim 12, wherein said brakes are provided with an anti-locking system.

14. A braking device according to claim 1, wherein said jack actuating the brakes has a negative pressure control.

15. A braking device according to claim 14, wherein said brakes are one of drum brakes and disk brakes.

16. A braking device according to claim 15, wherein said brakes are provided with an anti-locking system.

* * * * *

UNITED STATES PATENT AND TRADEMARK OFFICE
CERTIFICATE OF CORRECTION

PATENT NO.   : 5,382,085
DATED        : January 17, 1995
INVENTOR(S)  : Otto ZBINDEN It is certified that error appears in the above-indentified patent and that said Letters Patent is hereby corrected as shown below:

Column 9:
Claim 4, line 2, before "disconnection" insert --a--.
Column 10:
Claim 7, line 3, before "a" insert --via--.

Signed and Sealed this

Fourteenth Day of May, 1996

Attest:

BRUCE LEHMAN

*Attesting Officer*        *Commissioner of Patents and Trademarks*